United States Patent [19]

Grollimund

[11] Patent Number: 4,506,952

[45] Date of Patent: Mar. 26, 1985

[54] LENS MOUNT

[75] Inventor: Everett C. Grollimund, Midlothian, Va.

[73] Assignee: Philip Morris Incorporated, New York, N.Y.

[21] Appl. No.: 404,349

[22] Filed: Jul. 30, 1982

[51] Int. Cl.³ ............................................. G02B 7/04
[52] U.S. Cl. .................................................. 350/255
[58] Field of Search ........................................ 350/255

[56] References Cited

U.S. PATENT DOCUMENTS

| | | | |
|---|---|---|---|
| 1,331,174 | 2/1920 | Wescott | 350/255 |
| 3,441,339 | 4/1969 | Rederer et al. | 350/255 |
| 3,817,601 | 6/1974 | Colaiace et al. | 350/255 |
| 3,950,014 | 4/1976 | Doubleday | 285/DIG. 22 |
| 4,304,463 | 12/1981 | Tomori | 350/255 |

Primary Examiner—William H. Punter
Attorney, Agent, or Firm—Jeffrey H. Ingerman

[57] ABSTRACT

A precisely-adjustable lens mount is disclosed, comprising a lens holder having threads on a portion of its surface and a support for the lens holder, having a threaded portion threadedly engaging the lens holder threads. The threaded portion of either the lens holder or the support includes at least a portion that is resilient in a direction away from the threaded portion of the other, to allow the threads of the support and of the lens holder to engage each other with preloading to prevent the lens from shifting from its desired location.

8 Claims, 5 Drawing Figures

LENS MOUNT

BACKGROUND OF THE INVENTION

The present invention pertains to a lens mount, and more particularly pertains to a finely-adjustable mount for a lens for use with a high-energy light beam, such as a laser beam.

Lens mounts with which it is possible to adjust the position of a lens are known. Typically, the lens is secured to a lens holder that is threadedly received in a stationary housing. Rotation of the lens holder adjusts the lens position. If the housing threads fit too loosely with the lens holder threads, the lens holder may slide out of position.

SUMMARY OF THE INVENTION

The principal object of the invention is therefore to provide a precisely-adjustable lens mount free of the described problem.

Another object of the invention is to provide such a lens mount that can be finely adjusted by remote control.

The lens mount of the invention comprises a lens holder and a stationary housing or other support threadedly engaging the lens holder, either the support or the lens holder having a degree of resilience, or give, allowing the threaded engagement to be preloaded, so that the two sets of threads engage each other tightly enough to maintain the lens securely in position. Many ways of providing the necessary resilience are possible, and all are considered as within the scope of the invention, except as otherwise indicated by the terms of the appended claims.

According to one preferred embodiment, the lens holder comprises a cylindrical sleeve or tube supporting at one end a lens and having at least three and preferably four radial projections equally spaced around the circumference of the cylinder. The housing or support is a stationary cylindrical shell which is threaded on a portion of its internal surface. The lens holder projections are threaded to engage the threads of the support. Paraxial slots, extending through the entire thickness of the lens holder, are located to each side of each projection, providing a certain degree of radial give in the regions of the tube adjacent to the projections. The outer diameter of the lens holder, as measured through the projections when the lens holder is not received in the support, is equal to or slightly greater than the inner diameter of the threaded portion of the support. The housing and tube projection threads are preferably cut to provide line-to-line interference (i.e., zero clearance) or a slight positive interference between the housing threads and the lens holder threads. Both sets of threads should be cut with tolerances preferably at least as strict as required by good class standards (e.g., to within about 0.001 inch). The give in the regions of the tube wall adjacent to the projections is sufficient to compensate for the radial difference, if any, for the interference between the housing threads and the lens holder threads, and for the radial compressive force exerted on the lens holder by the support as a result of the radial difference and the thread interference. The radially inward compressive force which the support exerts on the projections when the lens holder tube is received in the support retains the lens holder in place axially of the support. The lens can be positioned where desired with good precision, and, once positioned, will not shift.

In another preferred embodiment, the radial projections are disposed on the inner surface of the support, which is slotted adjacent to each projection.

DETAILED DESCRIPTION OF THE PREFERRED EMBODIMENT

Figure 1:
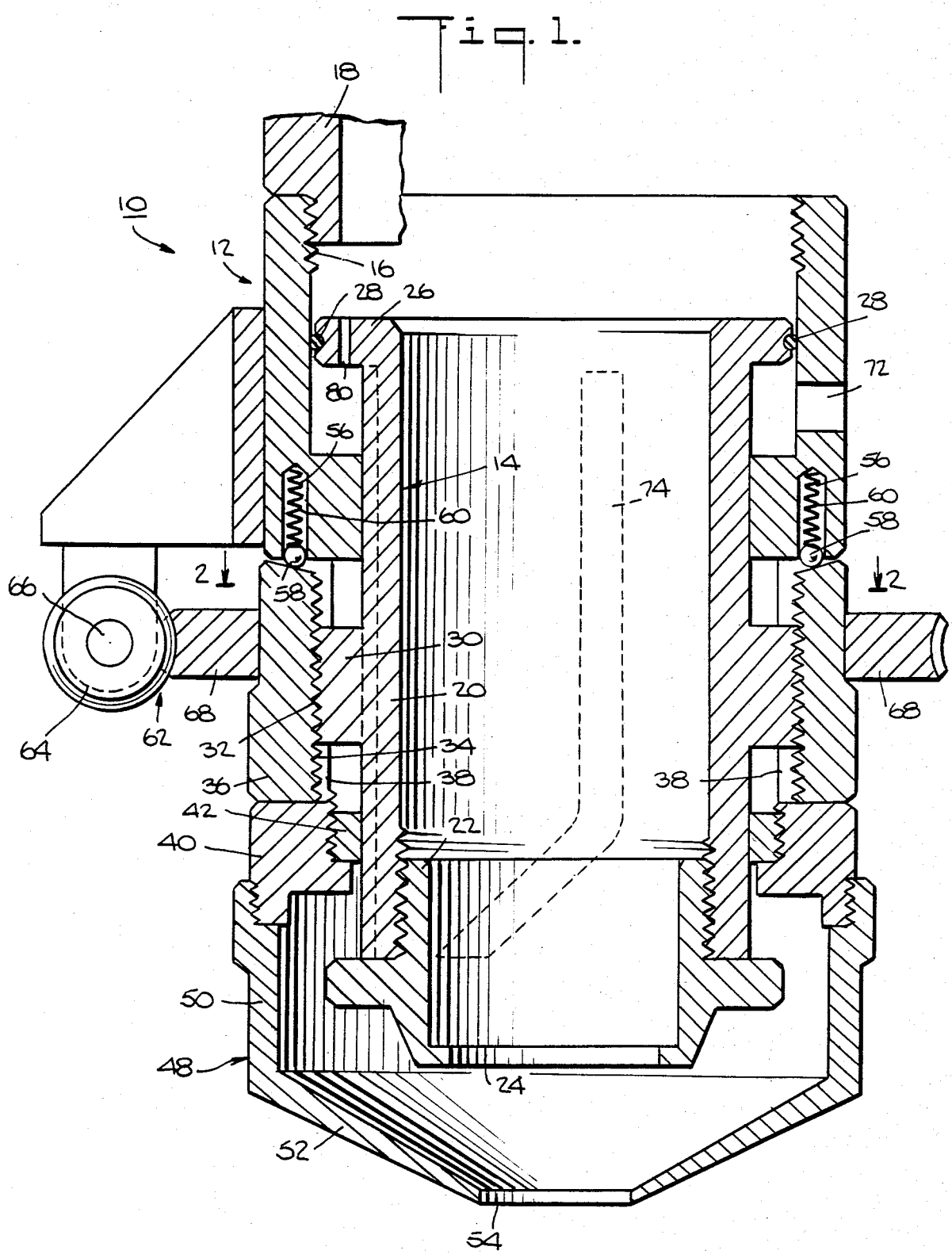
FIG. 1 is a longitudinal cross-sectional view of the preferred embodiment of a lens mount according to the invention.

The preferred embodiment of the lens mount 10, shown most clearly in FIG. 1, comprises a stationary support or housing 12 and, received inside the housing 12, a lens holder 14. In the preferred embodiment, the housing 12 and the lens holder 14 are both cylindrical. Threads 16 on the interior of the upper end of cylindrical housing 12 secure the housing 12 to the object 18 (shown broken away) to which the lens is to be mounted. (All uses herein of "upper", "lower", etc., apply to the orientation shown in FIG. 1; however, it will be understood that the lens mount of the invention can be used equally well in any orientation.)

Figure 2:
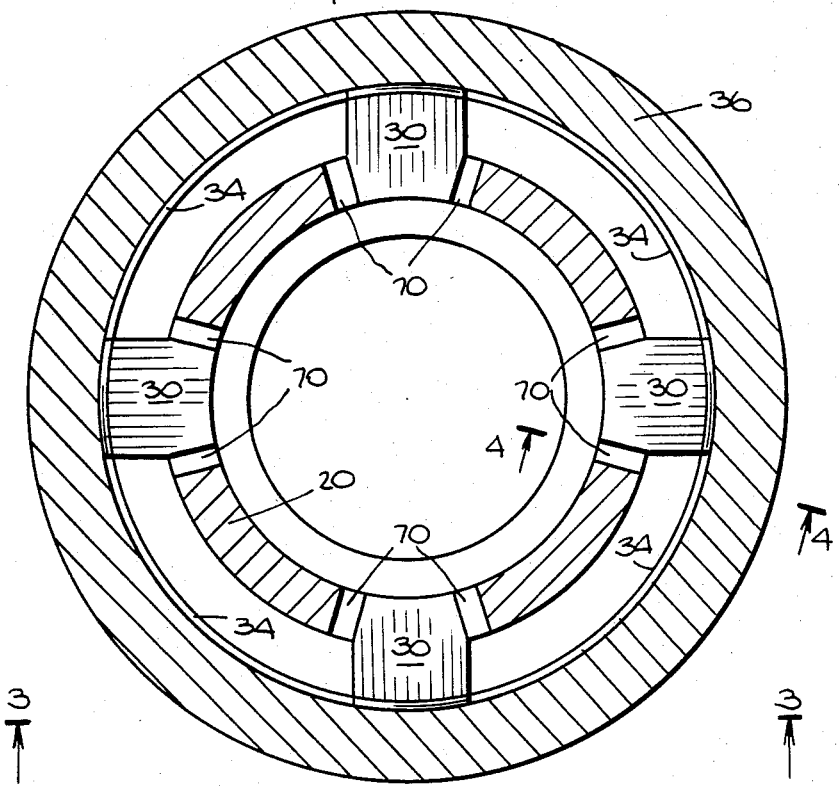
FIG. 2 is a cross-sectional view taken from section line 2—2 in FIG. 1.

The lens holder 14 comprises a support tube 20. A conventional lens support 22 threaded into the lower end of the support tube 20 bears the lens 24. The upper end of the support tube 14 has an external flange 26 slidingly received in the housing 12. A seal ring 28 is disposed in a groove in the circumferential edge of the flange 26. The axially middle portion of the support tube 14 has four block-like radially outward-extending projections 30 equally spaced about the longitudinal axis of the lens holder 14 (See FIG. 2). Each projection 30 has an outer surface 32 threaded to mesh with the threads 34 of an internally threaded rotatable collar 36 disposed on a circumferential shoulder of the housing 12. Preferably, the threads on surfaces 32 should mesh with the threads 34 with zero clearance or even with a slight positive interference, and both should be cut with tolerances at least as strict as required by good class standards (e.g., to within about 0.001 inch, depending on the degree of precision desired in positioning the lens).

Four apertures 38 are provided in the housing 12 to permit the projections 30 to engage the rotatable collar 36. The apertures 38 also cooperate with the projections 30 to prevent rotation of the lens holder 14 relative to the support 12. An end collar 40 removably attached to the lower end of the housing 12 retains the rotatable collar 36 in place axially while allowing the latter to rotate. An inner collar 42 is threadedly received in the end collar 40 and slidably receives the lens holder tube 20.

Figure 3:
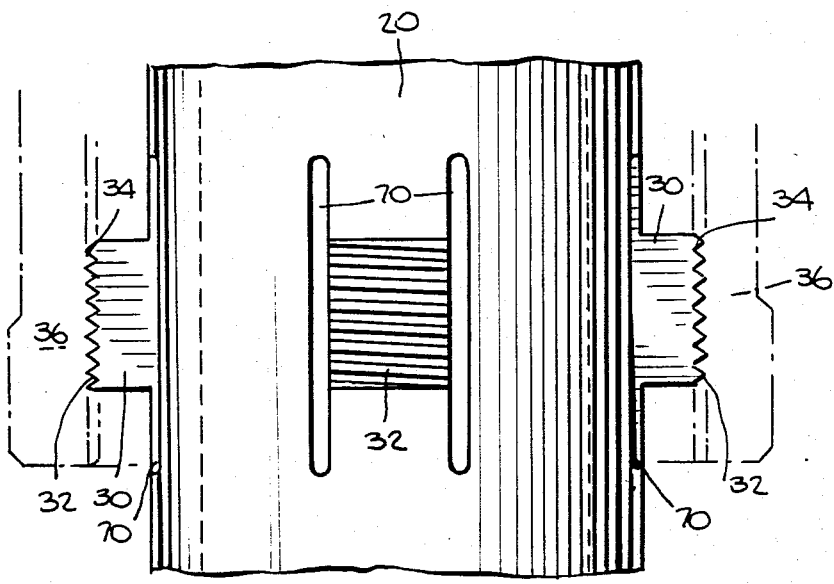
FIG. 3 is a view of a portion of the exterior of the lens holder of the embodiment of FIG. 1, taken from line 3—3 in FIG. 2.
Figure 4:
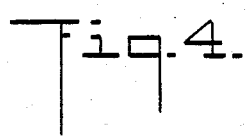
FIG. 4 is a sectional view taken from section line 4—4 in FIG. 2.

As can be seen most clearly in FIG. 3, two slots 70 parallel to the lens holder axis and extending through the whole thickness of the lens holder support tube 20 are provided beside each projection 30. Each slot 70 extends past the adjacent projection 30 a certain distance in both axial directions. The slots 70 provide some degree of resilience or give in the regions of the lens holder support tube wall axially adjacent to each projection 30.

The outer diameter of the lens holder 14, as measured through the projections 30 when the lens holder 14 is not in the housing 12, is equal to or slightly larger than the inner diameter of the rotatable collar 36. As a result, the collar 36 exerts a radially inward compression force on the projections 30. The resilience provided by the slots 70 permits the projections 30 to give radially inward enough to compensate for the difference in diameter (if any) and for the radial compressive force due to the tight fit of the projection threads 34 with those of the collar 36. As a result, the lens 24 can be positioned very precisely and with great reliability.

A conventional lens cone 48, having the shape of a cylindrical sleeve 50 with a conical surface 52 and a central aperture 54 at its lower end, is removably threaded onto the lower end of the end collar 40 to shield the lens 24 from dust. When one lens is changed for another of a different focal length, the lens cone is also changed.

Several paraxial cylindrical bores 56 are provided in the wall of the housing 12, equally spaced about the housing axis, and communicating with the circumferential recess receiving the rotatable collar 36. Each bore 56 contains a ball bearing 58 or the like pressed by a spring 60 against the upper (as seen in FIG. 1) edge of the rotatable collar 36, in which one or more shallow indentations (not shown) are provided to receive the ball bearings 58. The size of the indentations and of the ball bearings 58 and the strength of the springs 60 are such as not to prevent manual rotation of the rotatable collar 36. When the collar 36 is rotated, each ball bearing 58 makes a click each time an indentation is rotated past it. This arrangement thus indexes rotation of the collar 36.

The springs 60 also eliminate any axial clearance between the collar 36 and the shoulders of the circumferential recess in the housing 12 in which the collar 36 is received. This also aids in preventing unwanted shifting of the lens 24 from the desired position.

As will be understood from the foregoing, rotation of the collar 36 causes the lens holder 14 to move axially in the housing 12, adjusting the focus. To permit adjustment of the focus in this manner by remote control, a worm and wheel arrangement 62 is provided, rotation of the worm 64 about its axis 66 rotating the collar 36 via meshing of the worm 64 with the teeth of the wheel 68, which is a collar received on the outer surface of the housing 12.

If the lens 24 is to be used with laser light or other high-energy beams, it is desirable to cool the lens 24. For this purpose, a conventional cooling system comprising an air inlet 72 in the housing 12 and air passages 74 in the lens holder support tube walls is provided.

Air vents 80 are also provided in the support tube flange 26 to bleed air into the lens mount to provide a slight positive pressure inside the lens mount to prevent venturi flow and other unwanted effects, in a known manner.

Figure 5:
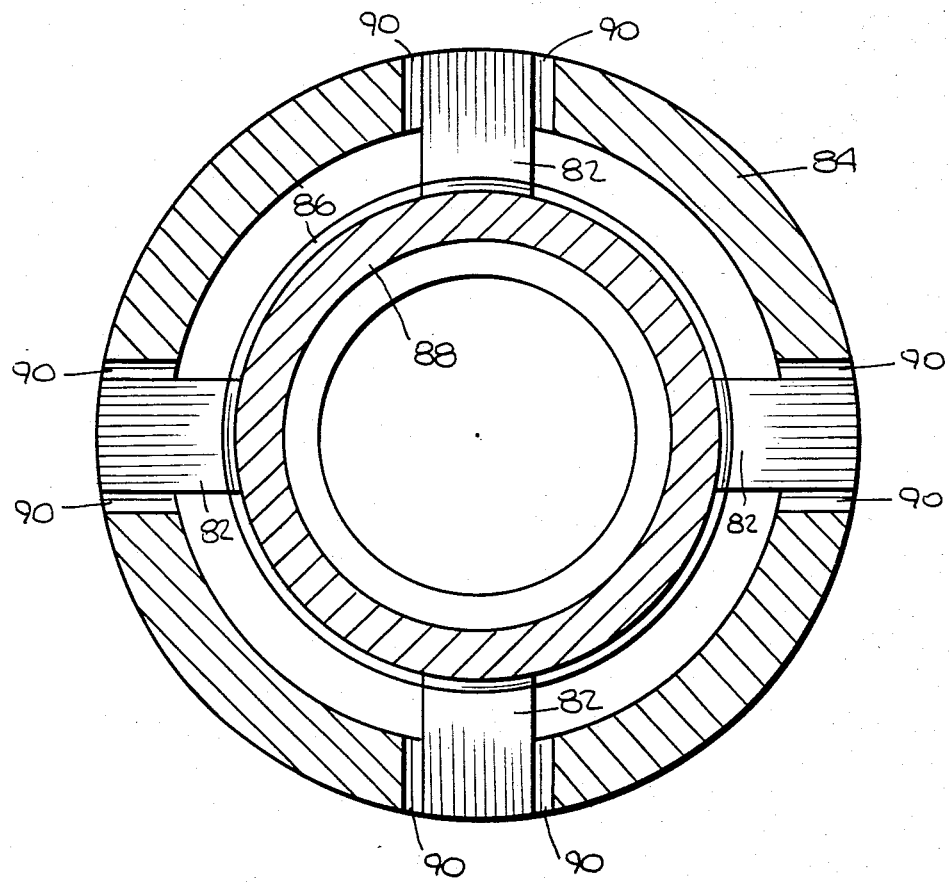
FIG. 5 is a view similar to that of FIG. 2 of a portion of a second preferred embodiment.

Alternatively, as shown in FIG. 5, the threaded projections 82 can be provided on the interior surface of the rotatable collar 84, and the entire axially central portion of the outer surface 86 of the support tube 88 is threaded. Slots 90 are provided beside each projection 82, as in the preferred embodiment shown.

Although the present invention has been described in detail with particular reference to one preferred embodiment thereof, many modifications and variations will now be apparent to those skilled in the art, and accordingly the scope of the invention is to be limited not by the details of the embodiment described herein but only by the terms of the appended claims.

I claim:

1. A lens mount comprising:
   support means having a threaded portion; and
   a lens holder supported by said support means, said lens holder having a threaded portion threadedly engaging said threaded portion of said support means, the threaded portion of said lens holder and the threaded portion of said support means being shaped to provide line-to-line to slight positive interference therebetween; and one of said support means and said lens holder including a resilient portion enabling said threaded portion of said lens holder to engage said threaded portion of said support means with substantially zero clearance and without backlash.

2. The lens mount of claim 1, wherein said resilient portion comprises means defining aperture means in said lens holder.

3. The lens mount of claim 2, wherein said threaded portion of said lens holder comprises projections having threaded surfaces threadedly engaging said support means.

4. The lens mount of claim 3, wherein said aperture means includes two parallel slots adjacent each said projection, one said slot being to each side of each said projection.

5. The lens mount of claim 1, wherein said resilient portion comprises means defining aperture means in said support means.

6. The lens mount of claim 5, wherein said threaded portion of said support means comprises projections having threaded surfaces threadedly engaging said lens holder.

7. The lens mount of claim 6, wherein said aperture means includes two parallel slots adjacent each said projection, one said slot being to each side of each said projection.

8. The lens mount of claim 1, further comprising worm-and-wheel means for adjusting said lens mount.

* * * * *